Sept. 14, 1943.   H. F. HALL   2,329,609
CORN PLOW ATTACHMENT
Filed June 9, 1942   2 Sheets-Sheet 1

Inventor
Harold F. Hall
By Clarence A. O'Brien
and Harvey B. Jacobson
Attorneys

Sept. 14, 1943.   H. F. HALL   2,329,609
CORN PLOW ATTACHMENT
Filed June 9, 1942   2 Sheets-Sheet 2

Inventor
Harold F. Hall
By Clarence A. O'Brien
and Harvey B. Jacobson
Attorneys

Patented Sept. 14, 1943

2,329,609

UNITED STATES PATENT OFFICE 2,329,609

CORN PLOW ATTACHMENT

Harold F. Hall, Harrod, Ohio

Application June 9, 1942, Serial No. 446,372

1 Claim. (Cl. 97—188)

The present invention relates generally to new and useful improvements in corn plows, and has for its primary object to provide, in a manner as hereinafter set forth, novel means for positively preventing dirt from curling over the usual fender blades and falling on the young corn therebetween.

Another very important object of the invention is to provide an attachment of the aforementioned character which is adapted to be expeditiously mounted for use on a conventional corn plow without the necessity of making material structural alterations therein.

Other objects of the invention are to provide a corn plow attachment which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a perspective view of the shield.

Figure 1:
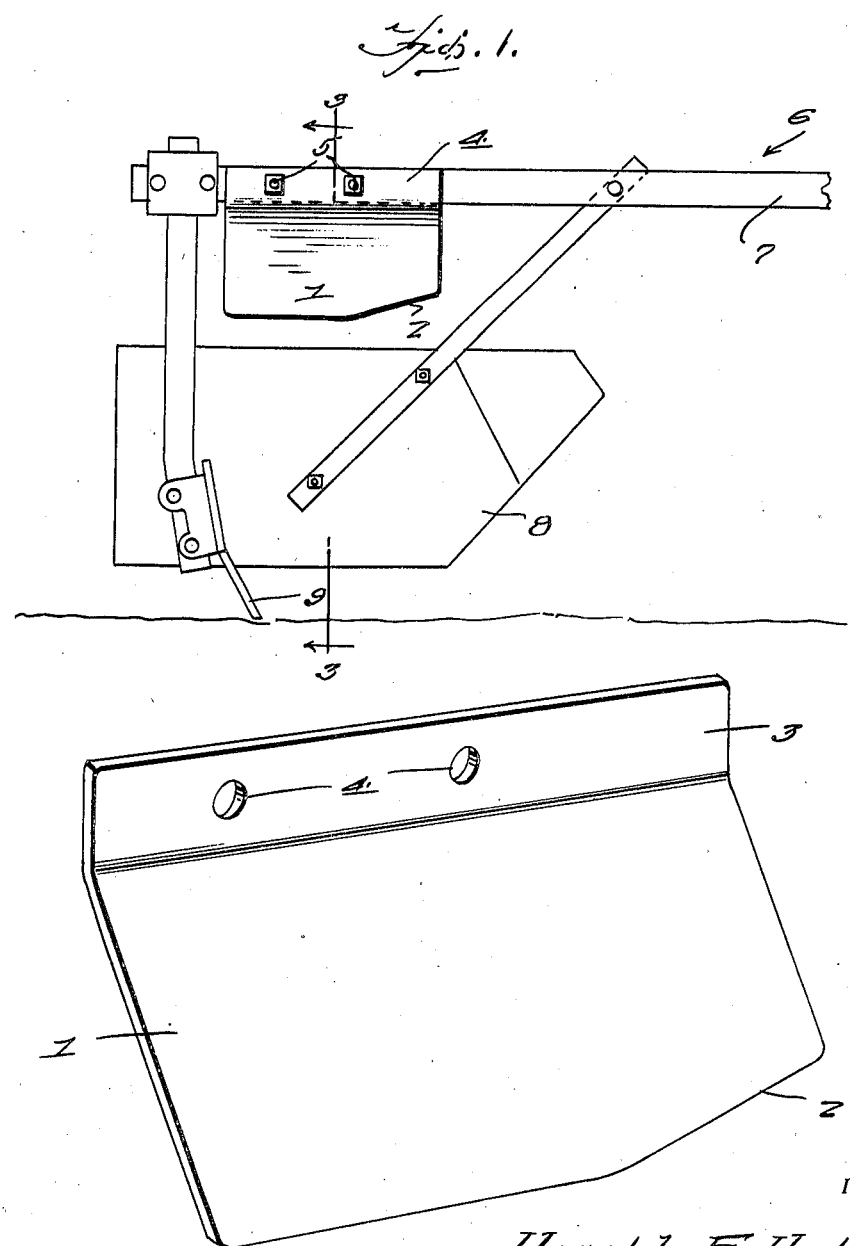
Figure 1 is a view in side elevation, showing a corn plow equipped with the present invention.
Figure 2:
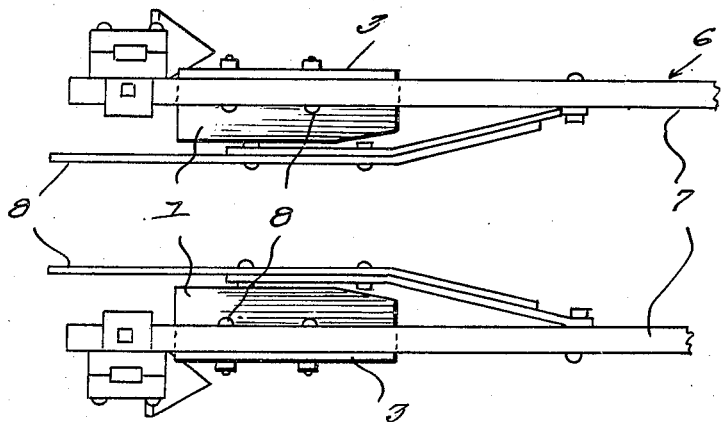
Figure 2 is a top plan view thereof.

Referring now to the drawings in detail, it will be seen that the embodiment of the invention which has been illustrated comprises a shield 1 in the form of a plate of suitable metal. The lower edge of the plate 1 comprises a tapered forward portion 2.

Extending at an obtuse angle from the upper longitudinal edge of the plate 1 is an integral flange 3. The flange 3 has formed therein a plurality of suitably spaced openings 4 for the reception of securing bolts 5.

Figure 3:
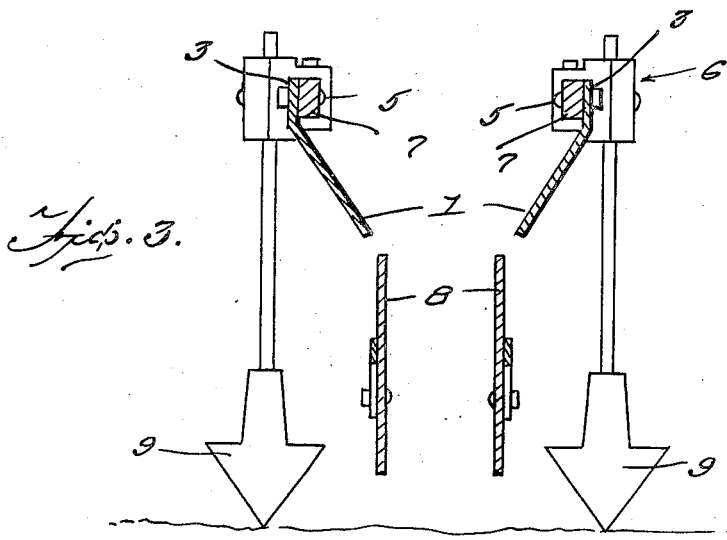
Figure 3 is a cross sectional view, taken substantially on the line 3—3 of Figure 1.

As illustrated to advantage in Figure 3 of the drawings, two of the plates 1 are mounted on the corn plow 6, one on each of the beams 7 of said plow. The construction and arrangement is such that the plates 1 extend downwardly and inwardly at an inclination from the beams 7 adjacent the upper edges of the usual fender blades 8. Thus, dirt from the shovels 9 is positively prevented from passing over the fender blades 8 and falling on the young corn therebetween. The shields will continue to function after the fender is removed from the plow, as when the corn is older and said fender is no longer needed.

It is believed that the many advantages of a corn plow attachment constructed in accordance with the present invention will be readily understood, and although a preferred embodiment of the device is as illustrated and described, it is to be understood that changes in the details of construction may be resorted to which will fall within the scope of the invention as claimed.

What is claimed is:

The combination with a corn plow including a pair of beams and a pair of spaced, parallel, vertically swinging fender plates pivotally connected thereto and operable below the horizontal and inwardly of the vertical planes thereof, of an attachment comprising a pair of downwardly converging plates suspended from the beams and having their lower edges adjacent the upper edges of the fender plates, and obtuse, apertured flanges, integral with the upper portions of the second named plates, rising therefrom and secured to the beams, said second named plates constituting means for deflecting dirt downwardly and preventing said dirt from passing inwardly over said fender plates.

HAROLD F. HALL.